(12) United States Patent
Oka et al.

(10) Patent No.: US 6,507,505 B2
(45) Date of Patent: Jan. 14, 2003

(54) POWER CONVERSION DEVICE

(75) Inventors: Toshiaki Oka, Tokyo (JP); Kazuto Kawakami, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/824,514

(22) Filed: Apr. 3, 2001

(65) Prior Publication Data

US 2001/0048604 A1 Dec. 6, 2001

(30) Foreign Application Priority Data

Apr. 3, 2000 (JP) ........................................ 2000-101035

(51) Int. Cl.[7] ................................................ H02M 1/12
(52) U.S. Cl. ............................ 363/47; 363/89; 307/105
(58) Field of Search ................................ 363/39, 44–47, 363/89, 125; 307/105

(56) References Cited

U.S. PATENT DOCUMENTS

| | | | | |
|---|---|---|---|---|
| 4,685,044 A | * | 8/1987 | Weibelzahl et al. | ............ 363/35 |
| 5,047,909 A | * | 9/1991 | Hosoda | ........................ 318/806 |
| 6,038,152 A | * | 3/2000 | Baker | ......................... 363/126 |

OTHER PUBLICATIONS

Japanese Language Abstract with Translation: Matsui Kageki et al., "Apparatus and Method for Converting Power.", Publication No. 10–164847, Jun. 19, 1998, Dialog File No. 347, Accession No. 5881747.

* cited by examiner

*Primary Examiner*—Jeffrey Sterrett
*Assistant Examiner*—Gary L. Laxton
(74) *Attorney, Agent, or Firm*—Foley & Lardner (57) ABSTRACT

In a power conversion device comprising an AC filter 2 for harmonic current suppression having a combination of at least some of a reactor, capacitor and resistance and a power conversion circuit 3 that converts AC power into DC power or DC power into AC power and is connected to an AC power source 1 through AC filter 2, by providing: voltage reference calculation means (unit) 5 that calculates and outputs a voltage reference corresponding to the voltage that is to be output by the power conversion device main unit; current detection means (unit) 4 that detects and outputs current flowing through a prescribed location between AC power source 1 and power conversion circuit 3; and voltage reference correction means (unit) 8 that uses the output from current detection means (unit) 4 as a voltage reference correction signal to correct the voltage reference that is output from voltage reference calculation means (unit) 5, resonance of the AC filter for harmonic current suppression is suppressed without employing a damping resistance for resonance suppression.

19 Claims, 9 Drawing Sheets

POWER CONVERSION DEVICE

BACKGROUND OF THE INVENTION

1. Field of the Invention

The present invention relates to a power conversion device that converts AC power into DC power or DC power into AC power and more particularly relates to a power conversion device of small size wherein resonance of the AC filter for harmonic current suppression can be suppressed without using a damping resistance for resonance suppression.

2. Description of the Related Art

Power conversion devices constituted by PWM (Pulse Width Modulation) converter devices (hereinbelow simply called converter devices) in which for example AC power is converted to DC power have previously become well known in which self-turn-off switching devices are employed.

Figure 1:
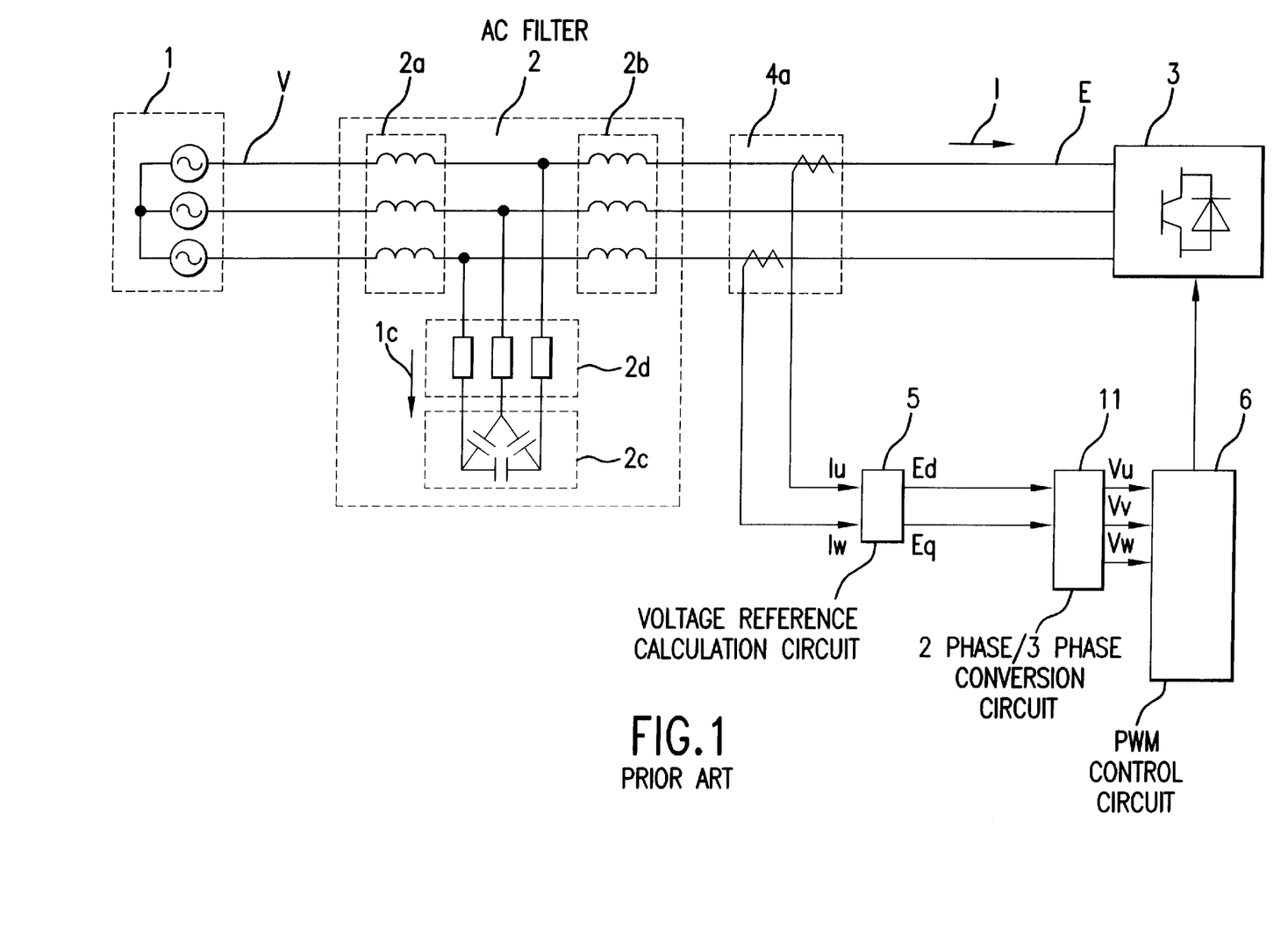
FIG. 1 is a block circuit diagram illustrating an example of the layout of a prior art converter device.

FIG. 1 is a block circuit diagram showing an example of the construction of a conventional converter device of this type.

As shown in FIG. 1, the converter device comprises reactors 2a, 2b, capacitor 2c, AC filter 2 for suppression of harmonic current comprising a damping resistance 2d, and a PWM converter (hereinbelow simply called a converter) 3 constituting a power conversion circuit that converts AC power to DC power and is connected to AC power source 1 through this AC filter 2.

The AC currents iu and iw of converter 3 detected by converter output current detector 4a are decomposed into the current component (active component) parallel with the voltage vector of the AC voltage and the current component (reactive component) orthogonal thereto by voltage reference calculation circuit 5 and a vector control calculation is then made; thus, the voltage reference corresponding to the voltage to be output by the converter circuit is calculated as the voltage component Eq parallel with the voltage vector of the AC voltage and the voltage component Ed orthogonal thereto.

This calculated voltage reference is converted to a 3-phase AC voltage reference by a 2-phase/3-phase conversion circuit 11 and controls the AC output voltage of converter 3 by performing PWM control by being input to the PWM control circuit 6.

The frequency component of the carrier wave that is employed in the PWM control circuit 6 in the converter device flows to AC power source 1 as harmonic current.

Accordingly, in order to suppress this, an AC filter 2 comprising reactors 2a and 2b and a capacitor 2c is connected between AC power source 1 and converter 3.

However, this AC filter 2 has a self-resonance frequency, and if the harmonic current created by PWM control switching coincides with this self-resonance frequency, resonance occurs, distorting the AC current.

Accordingly, conventionally, in order to suppress this resonance phenomenon, a damping resistance 2d was connected in series with capacitor 2c.

The details of voltage reference calculation circuit 5 and 2-phase/3-phase conversion circuit 11 are prior art disclosed in for example Early Japanese Patent Publication No. H. 10-105261; a detailed description thereof is therefore omitted.

However, although, in a prior art converter device constituting a power conversion device constructed in such a way having an AC filter 2 and a damping resistance 2d for resonance suppression, resonance of the AC filter 2 can be suppressed, there are the problems that the effectiveness of capacitor 2c which is inserted in order to bypass the harmonic current is lowered by the insertion of damping resistance 2d, with the result that the harmonic current flowing in AC power source 1 is increased and the device becomes large in size due to the insertion of damping resistance 2d.

SUMMARY OF THE INVENTION

Accordingly, one object of the present invention is to provide a novel power conversion device of small size capable of suppressing resonance of the AC filter for harmonic current suppression, without employing a damping resistance for resonance suppression.

In order to achieve the above object, according to the present invention, in a power conversion device comprising an AC filter for harmonic current suppression comprising a combination of at least some of a reactor, capacitor and resistance and a power conversion circuit that converts AC power into DC power or DC power into AC power and is connected to an AC power source through the AC filter, there are provided: voltage reference calculation means (unit) that calculates and outputs a voltage reference corresponding to the voltage that is to be output by the power conversion device main unit; current detection means (unit) that detects and outputs current flowing through a prescribed location between the AC power source and the power conversion circuit; and voltage reference correction means (unit) that uses the output from the current detection means (unit) as a voltage reference correction signal to correct the voltage reference that is output from the voltage reference calculation means (unit).

Consequently, in a power conversion device according to the present invention, by detecting the current flowing through a prescribed location between the AC power source and the power conversion circuit, and using this as a voltage reference correction signal to correct the voltage reference, the power conversion circuit being controlled using this corrected new voltage reference, the resonance current of the AC filter can be damped in the same way as if a damping resistance were connected.

Also according to the present invention, in the power conversion device, as the current detection means (unit), the current flowing through a capacitor of the AC filter is detected; and as the voltage reference correction means (unit), a quantity responsive to the output from the current detection means (unit) is used as a voltage reference correction signal, which is added to the voltage reference which is output from the voltage reference calculation means (unit) to constitute a new voltage reference.

Consequently, in a power conversion device according to the present invention, by detecting the current flowing in a capacitor of the AC filter and using this as a voltage reference correction signal to correct the voltage reference, and controlling the power conversion circuit using this corrected new voltage reference, the resonance current of the AC filter can be damped in the same way as if a damping resistance were connected.

Further, according to the present invention, in the power conversion device, as the current detection means (unit), the current flowing between the AC filter and the power conversion circuit is detected; and as the voltage reference correction means (unit), a quantity responsive to the output from a bandpass filter that passes the self-resonance frequency band of the AC filter and is connected on the output side of the current detection means (unit) is used as a voltage reference correction signal which is added to the voltage reference constituting the output from the voltage reference calculation means (unit) to constitute a new voltage reference.

Consequently, in a power conversion device according to the present invention, the current flowing between the AC filter and the power conversion device is detected, and, using a quantity responsive to the output obtained by passing this through a bandpass filter that passes the self-resonance frequency band of the AC filter as a voltage reference correction signal to correct the voltage reference, the power conversion circuit is controlled using this corrected new voltage reference; damping of the resonance current of the AC filter can thereby be achieved in the same way as if a damping resistance were connected.

Further, according to the present invention, in the power conversion device, as the current detection means (unit), the current flowing between the AC power source and the AC filter is detected; and as the voltage reference correction means (unit), a quantity responsive to the output from a bandpass filter that passes the self-resonance frequency band of the AC filter and is connected on the output side of the current detection means (unit) is used as a voltage reference correction signal which is added to the voltage reference constituting the output from the voltage reference calculation means (unit) to constitute a new voltage reference.

Consequently, in a power conversion device according to the present invention, the current flowing between the AC power source and the AC filter is detected, and, using a quantity responsive to the output obtained by passing this through a bandpass filter that passes the self-resonance frequency band of the AC filter as a voltage reference correction signal to correct the voltage reference, the power conversion circuit is controlled using this corrected new voltage reference; damping of the resonance current of the AC filter can thereby be achieved in the same way as if a damping resistance were connected.

Further, according to the present invention, in the power conversion device, as the current detection means, the current flowing between the AC filter and the power conversion circuit is detected; and as the voltage reference correction means (unit), a quantity responsive to the output from a high-pass filter that passes frequencies above a specified frequency and is connected on the output side of the current detection means (unit) is used as a voltage reference correction signal which is added to the voltage reference constituting the output from the voltage reference calculation means (unit) to constitute a new voltage reference.

Consequently, in a power conversion device according to the present invention, the current flowing between the AC filter and the power conversion circuit is detected, and, using a quantity responsive to the output obtained by passing this through a high-pass filter that passes frequencies above a specified frequency as a voltage reference correction signal to correct the voltage reference, the power conversion circuit is controlled using this corrected new voltage reference; damping of the resonance current of the AC filter can thereby be achieved in the same way as if a damping resistance were connected.

Further, according to the present invention, in the power conversion device, as the current detection means (unit), the current flowing between the AC power source and the AC filter is detected; and as the voltage reference correction means (unit), a quantity responsive to the output from a high-pass filter that passes frequencies above a specified frequency and is connected to the output of the current detection means (unit) is used as a voltage reference correction signal which is added to the voltage reference constituting the output from the voltage reference calculation means (unit) to constitute a new voltage reference.

Consequently, in a power conversion device according to the present invention, the current flowing between AC power source and the AC filter is detected, and, using a quantity responsive to the output obtained by passing this through a high-pass filter that passes frequencies above a specified frequency as a voltage reference correction signal to correct the voltage reference, the power conversion circuit is controlled using this corrected new voltage reference; damping of the resonance current of the AC filter can thereby be achieved in the same way as if a damping resistance were connected.

Further, according to the present invention, in the power conversion device, as the voltage reference correction means (unit), there is provided phase shift means (unit) that shift the phase of the current which is output from the current detection means (unit) relative to the phase of the voltage of the AC power source, the voltage reference correction signal being found using the output from the phase shift means (unit) in place of the output from the current detection means (unit).

Consequently, in a power conversion device according to the present invention, by shifting the phase of the current detected by the current detection means (unit) with respect to the phase of the voltage of the AC power source, and using this to find a voltage reference correction signal to correct the voltage reference, and controlling the power conversion circuit using this corrected new voltage reference, the resonance current of the AC filter can be damped in the same way as if a damping resistance were connected.

Further, according to the present invention, in the power conversion device, the signal obtained by shifting the phase of the voltage reference correction signal is used as a new voltage reference correction signal which is added to the voltage reference that is output from the voltage reference calculation means (unit) to constitute a new voltage reference.

Consequently, in a power conversion device according to the present invention, by shifting the phase of the voltage reference correction signal, and using this to find a voltage reference correction signal to correct the voltage reference, and controlling the power conversion circuit using this corrected new voltage reference, the resonance current of the AC filter can be damped in the same way as if a damping resistance were connected.

By means of the above, resonance of the AC filter for harmonic current suppression can therefore be suppressed without using a damping resistance for resonance suppression.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views, and more particularly to FIG. 2 thereof, one embodiment of the present invention will be described.

First of all, the concept of the present invention will be described.

If a damping resistance $2d$ is present for resonance suppression as shown in FIG. 1 described above, and if the AC output voltage of converter 3 is E, the voltage of AC power source 1 is V, the output current of converter 3 is I, the current of capacitor $2c$ is Ic, the self-inductances of reactors $2a$ and $2b$ respectively are $L_1$ and $L_2$, the capacitor capacitance per phase of capacitor $2c$ is C, and the resistance of damping resistance $2d$ is R, the following relationship expression (1) is satisfied.

Further, if the R·Ic term in expression (1) is moved to the left-hand side, the expression (1)' is obtained.

$$E = j \cdot \omega \cdot L_2 \cdot I + Ic/j \cdot \omega \cdot C + R \cdot Ic + V \qquad (1)$$

$$E - R \cdot Ic = j \cdot \omega \cdot L_2 \cdot I + Ic/j \cdot \omega \cdot C + V \qquad (1)'$$

If the AC output voltage of converter 3 when no damping resistance is connected is taken to be Ecnv, the current corresponding to the capacitor current is taken to be Ic*, and the control gain is taken to be K, by controlling the AC output voltage Ecnv of converter 3 in accordance with expression (2) below, the left-hand side of the above expression (1)' and the AC output voltage Ecnv of converter 3 become equal, with the results that the same beneficial effect as in the case of insertion of a damping resistance is obtained, and resonance of AC filter 2 can be suppressed.

$$Ecnv = E - K \cdot Ic* \qquad (2)$$

According to the present invention, resonance of the AC filter is therefore suppressed as described above.

An embodiment of the present invention based on the above concept is described in detail below with reference to the drawings

First Embodiment

Figure 2:
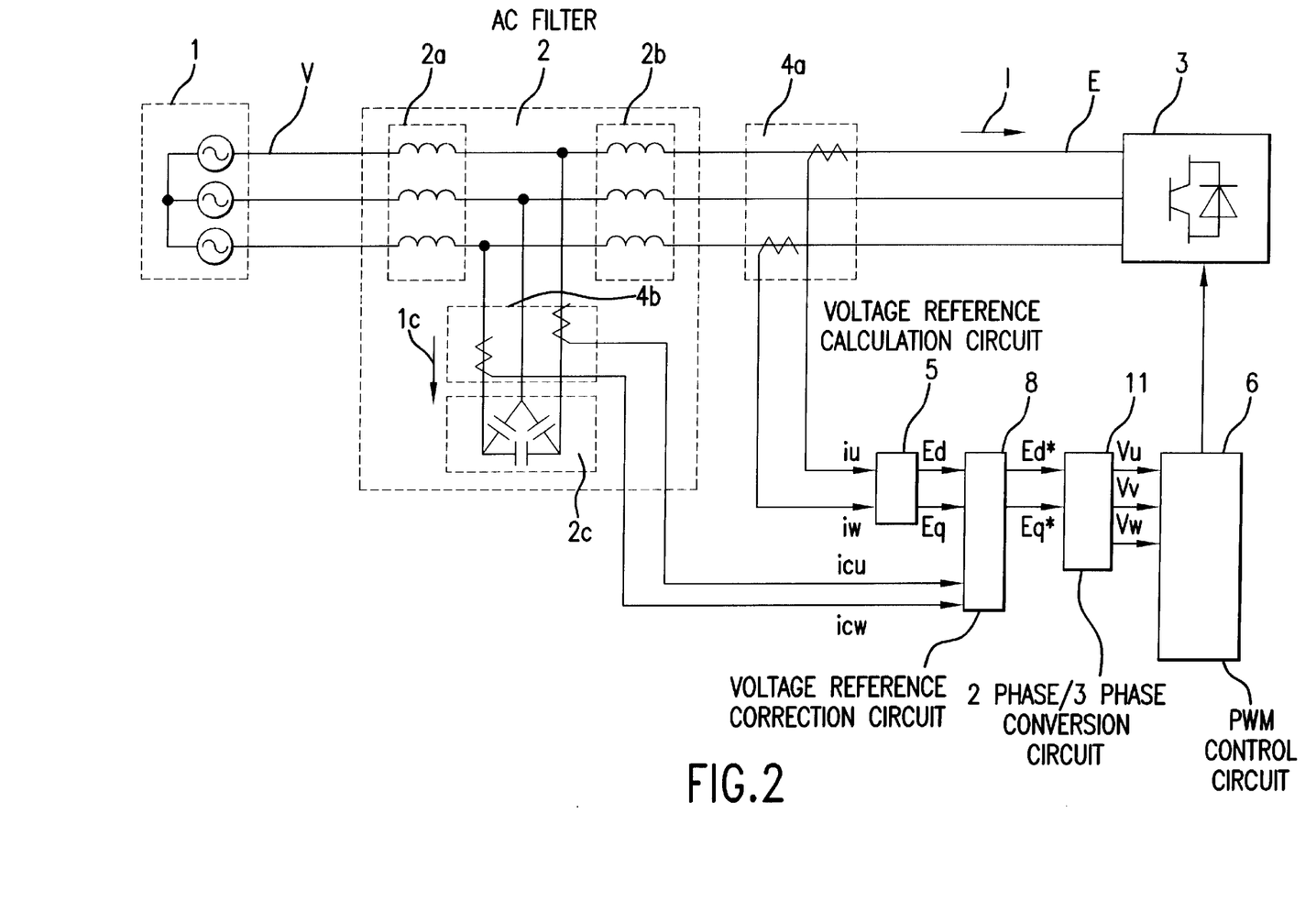
FIG. 2 is a block circuit diagram illustrating a first and sixth embodiment of a converter device constituting a power conversion device according to the present invention.

FIG. 2 is a block circuit diagram illustrating an example of the construction of a converter device constituting a power conversion device according to this embodiment; parts which are the same as in FIG. 1 are given the same reference symbols and further description thereof is omitted; only the parts which are different will be described.

Specifically, in the converter device according to this embodiment, as shown in FIG. 2, the damping resistance $2d$ for resonance suppression in FIG. 1 is omitted and instead of it there are newly provided a capacitor current detector $4b$ and a voltage reference correction circuit 8.

Capacitor current detector $4b$ detects the capacitor currents icu and icw flowing in capacitor $2c$ of AC filter 2. In this case, the capacitor currents of the two phases: U-phase and W-phase are detected.

Voltage reference correction circuit 8 is provided between the voltage reference calculation circuit 5 and the 2-phase/3-phase conversion circuit 11: it generates new voltage references Ed* and Eq* by finding, as voltage reference correction signals, quantities dependent on the capacitor currents icu and icw which are output from capacitor current detector $4b$, and correcting the voltage references Ed and Eq which are the outputs from voltage reference calculation circuit 5 by adding these thereto.

Figure 3:
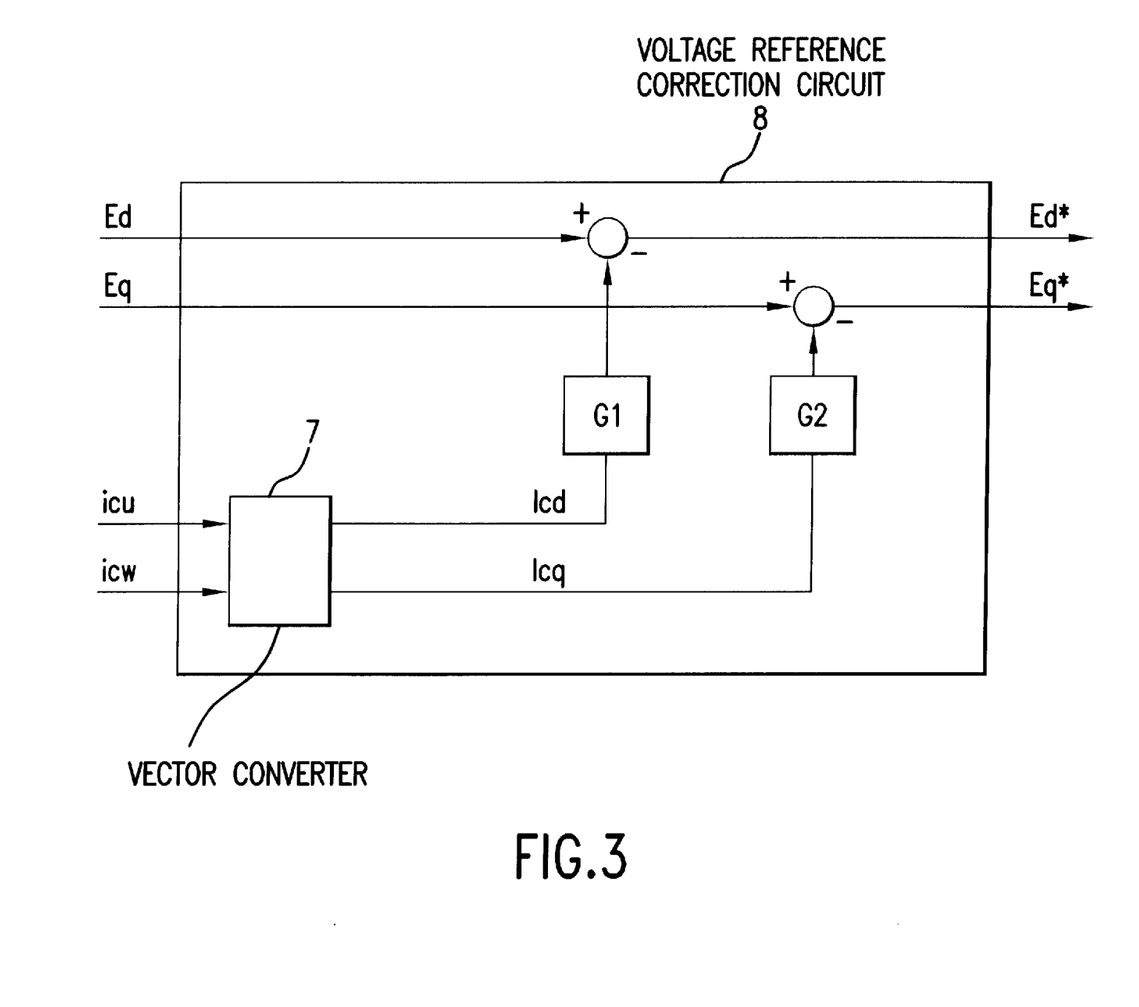
FIG. 3 is a block diagram illustrating an example of the detailed layout of a voltage reference correction circuit in a converter device according to a first embodiment of the present invention.

FIG. 3 is a block diagram illustrating an example of the detailed construction of voltage reference correction circuit 8.

Specifically, as shown in FIG. 3, the capacitor currents icu and iw detected by capacitor current detector $4b$ are decomposed by vector converter 7 into a current component Iq (active component) parallel with the voltage vector of the AC voltage and a current component Id (reactive component) orthogonal thereto, these are multiplied by respective gains, and added to the coaxial Ed and Eq to obtain new voltage references Ed* and Eq*.

Next, in a converter device according to this embodiment constructed as above, the currents iu and iw flowing in the capacitor $2c$ of AC filter 2 are detected and these are used as voltage reference correction signals to correct the voltage references Ed and Eq and new voltage references Ed* and Eq* are thereby obtained.

These are the same as the left-hand side of expression (2) given above; by performing PWM control of converter 3 using the voltage references Vu, Vv and Vw of each phase obtained by the 2-phase/3-phase conversion circuit 11 from these new voltage references Ed* and Eq*, damping of the resonance current of AC filter 2 can be achieved in the same way as if a damping resistance were connected.

In the above, it may be arranged to detect capacitor currents icu and icw by detecting the voltage of capacitor $2c$ and differentiating this signal (i=C·dv/dt).

Also, although, for the capacitor current, the 2-phase currents of the U-phase and W-phase were detected, it could be arranged to detect the current of another combination of 2-phase or 3-phase components.

As described above, with the PWM converter device according to this embodiment, the current flowing in the capacitor 2c of the AC filter 2 is detected, this is used as a voltage reference correction signal to correct the voltage reference, and the converter 3 is controlled using this new corrected voltage reference; it is thereby possible to suppress resonance due to AC filter 2 that is connected to converter 3 for harmonic current suppression, without using a damping resistance.

Second Embodiment

Figure 4:
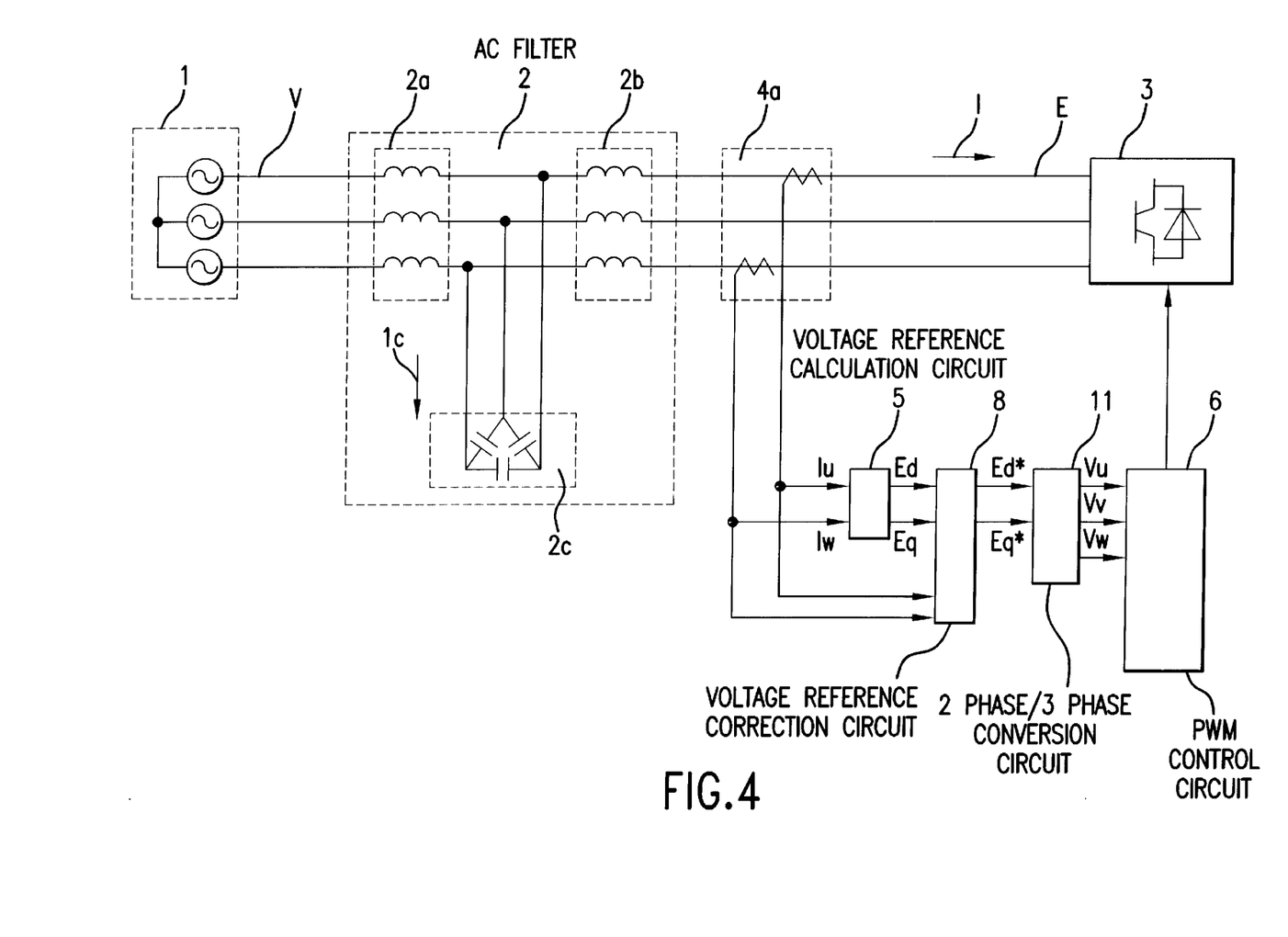
FIG. 4 is a block circuit diagram illustrating a second, third and sixth embodiment of a converter device constituting a power conversion device according to the present invention.

FIG. 4 is a block circuit diagram illustrating a constructional example of a converter device constituting a power conversion device according to this embodiment; parts which are the same as in FIG. 2 are given the same reference symbols and further description thereof is omitted; only the parts which are different are described.

Specifically, with the converter device of this embodiment, as shown in FIG. 4, a construction is adopted wherein the capacitor current detector 4b in FIG. 2 is omitted, and, as the input of the voltage reference correction circuit 8, instead of the capacitor currents icu and icw mentioned previously, the converter output currents iu and iw, which are output from converter output current detector 4a, are input.

Figure 5:
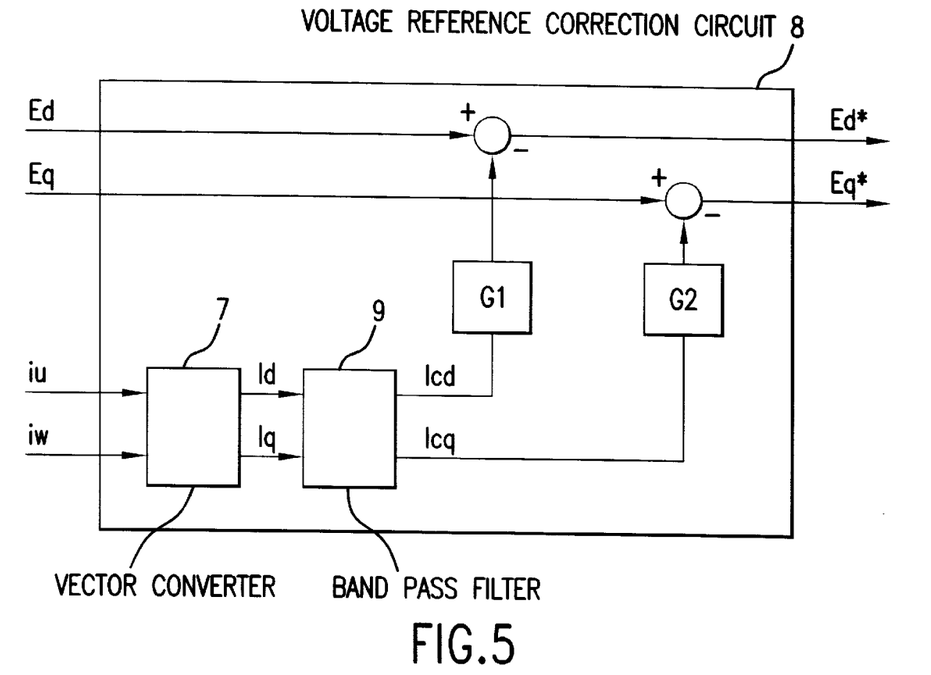
FIG. 5 is a block diagram illustrating an example of the detailed layout of a voltage reference correction circuit in a converter device according to a second embodiment of the present invention.

FIG. 5 is a block diagram illustrating an example of the detailed construction of voltage reference correction circuit 8; parts which are the same as in FIG. 1 are given the same reference symbols and further description thereof is omitted; only parts which are different are described.

That is, as shown in FIG. 5, this voltage reference correction circuit 8 is constituted by newly providing a bandpass filter 9 downstream of the vector converter 7 in FIG. 3.

Bandpass filter 9 passes the self-resonance frequency band of AC filter 2 i.e. it detects currents Icd and Icq of the frequency components including the resonance frequency of the converter output currents Id and Iq.

Next, in the converter device according to this embodiment constructed as described above, using bandpass filter 9 that passes the specified frequency band, currents Icd and Icq of frequency components including the resonance frequency of converter output currents Id and Iq are detected, and these are used as voltage reference correction signals to correct the voltage references Ed and Eq so that new voltage references Ed* and Eq* are obtained.

Thereupon, in the same way as in the first embodiment, by PWM control of the converter 3 using the voltage references Vu, Vv and Vw of each phase obtained by 2-phase/3-phase conversion circuit 11 from these new voltage references Ed* and Eq*, damping of the resonance current of AC filter 2 can be achieved in the same way as if a damping resistance were connected.

As described above, with a PWM converter device according to this embodiment, the current flowing between AC filter 2 and converter 3 i.e. the converter output currents Id and Iq are detected and quantities dependent on the outputs obtained by passing these through bandpass filter 9 that passes the self-resonance frequency band of AC filter 2 are used as voltage reference correction signals to correct the voltage references; converter 3 is arranged to be controlled using these corrected new voltage references, and so resonance due to AC filter 2 for harmonic current suppression, which is connected to converter 3, can be suppressed, without using a damping resistance.

Third Embodiment

The construction of the converter device constituting the power conversion device of this embodiment is exactly the same as the construction illustrated in FIG. 4 described above, only the construction of the voltage reference correction circuit 8 being different.

Figure 6:
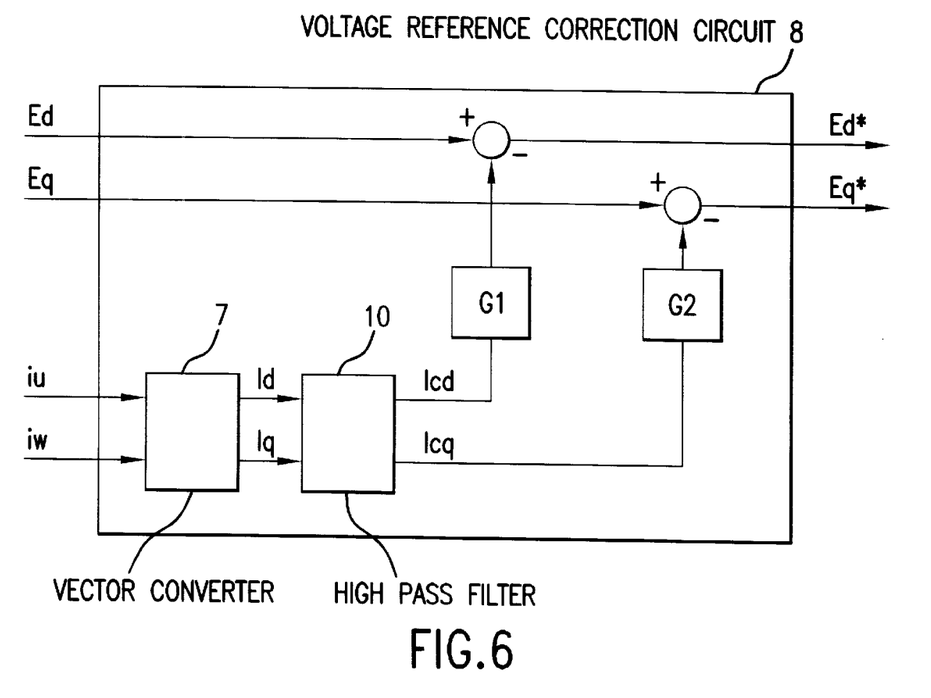
FIG. 6 is a block diagram illustrating an example of the detailed layout of a voltage reference correction circuit in a converter device according to a third embodiment of the present invention.

FIG. 6 is a block diagram illustrating an example of the detailed layout of a voltage reference correction circuit 8 according to this embodiment; parts which are the same as in FIG. 5 are given the same reference symbols and further description thereof is omitted; only the parts that are different are described.

Specifically, as shown in FIG. 6, in this voltage reference correction circuit 8, the bandpass filter 9 in FIG. 5 is omitted and a high-pass filter 10 is newly provided instead.

High-pass filter 10 passes frequencies above a specified frequency i.e. it detects currents Icd and Icq of frequency components exceeding the power source frequency.

Next, in a converter device according to this embodiment constructed as above, using the high-pass filter 10 that passes frequencies above a specified frequency, new voltage references Ed* and Eq* are obtained by detecting currents Icd and Icq of frequency components exceeding the power source frequency of converter output currents Id and Iq, and using these as voltage reference correction signals to correct the voltage references Ed and Eq.

Thus, in the same way as in the first embodiment described above, from these new voltage references Ed* and Eq*, by PWM control of converter 3 using the voltage references Vu, Vv and Vw of each phase obtained by 2phase/3-phase conversion circuit 11, damping of the resonance current of the AC filter 2 can be achieved in the same way as if a damping resistance were connected.

As described above, with a PWM converter device according to this embodiment, the current flowing between AC filter 2 and converter 3 i.e. the converter output currents Id and Iq are detected and quantities dependent on the outputs obtained by passing these through high-pass filter 10 that passes frequencies above a specified frequency are used as voltage reference correction signals to correct the voltage references; converter 3 is arranged to be controlled using these corrected new voltage references, and so resonance due to AC filter 2 for harmonic current suppression, which is connected to converter 3, can be suppressed, without using a damping resistance.

Fourth Embodiment

Figure 7:
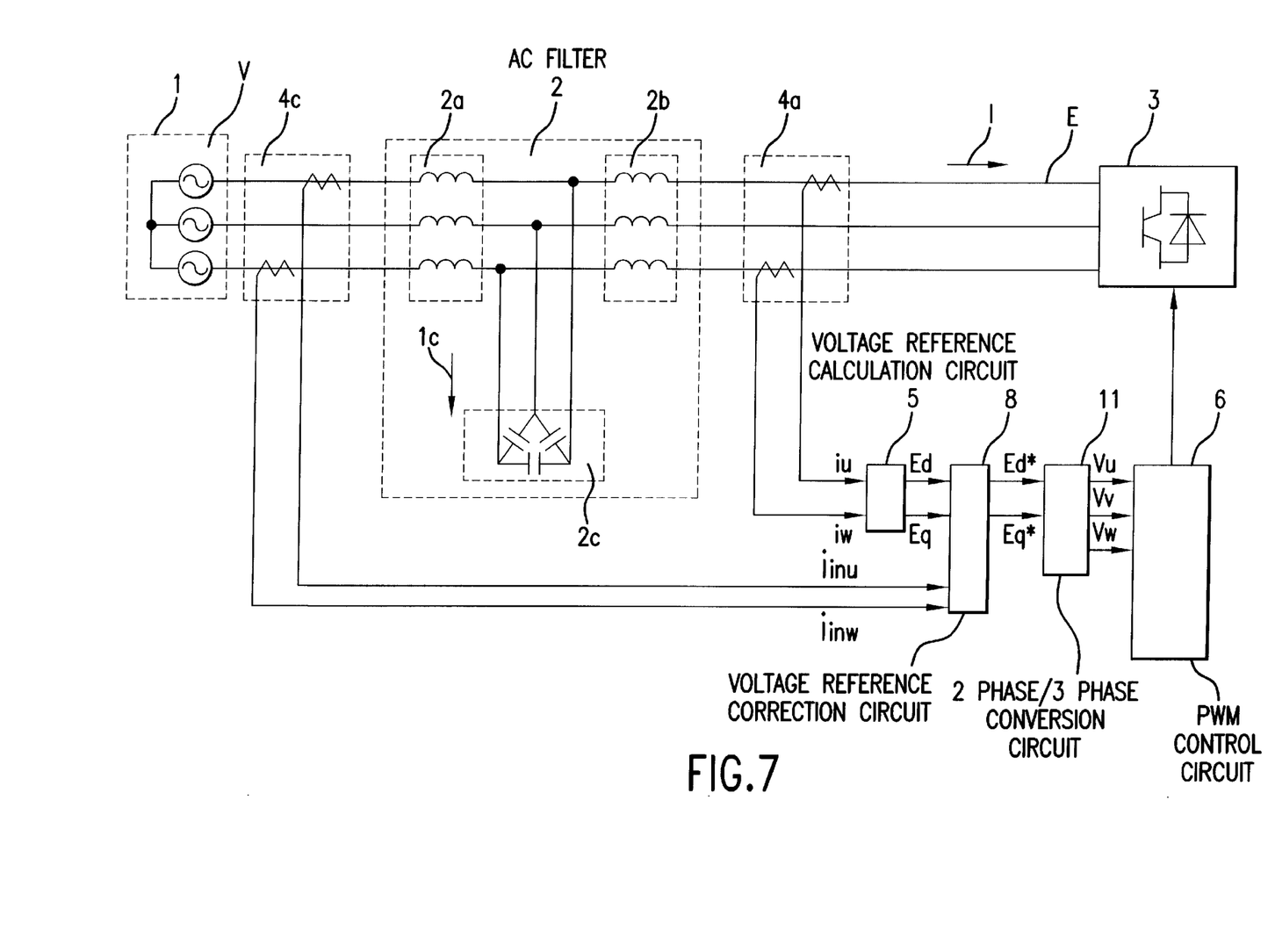
FIG. 7 is a block circuit diagram illustrating a fourth, fifth and sixth embodiment of a converter device constituting a power conversion device according to the present invention.

FIG. 7 is a block diagram illustrating an example of the detailed layout of a converter device constituting a power conversion device according to this embodiment; parts which are the same as in FIG. 4 are given the same reference symbols and further description thereof is omitted; only the parts that are different are described.

Specifically, as shown in FIG. 7, in the converter device according to this embodiment, in addition to FIG. 4 there is newly provided an AC input current detector 4c that detects AC input currents iinu and iinw, and, as the inputs of voltage reference correction circuit 8, instead of the output currents iu and iw of the converter referred to above, the AC input currents iinu and iinw, which are the outputs from the AC input current detector 4c, are input.

Also, as shown in a FIG. 5 described above, just as in the case of the second embodiment described above, voltage reference correction circuit 8 is provided with a bandpass filter 9 downstream of vector converter 7.

Next, in the converter device of this embodiment constructed as above, using bandpass filter 9 that passes a specified frequency band, currents Icd and Icq of frequency components including the resonance frequency of AC input currents iinv and iinw are detected, and these are used as voltage reference correction signals to correct voltage references Ed and Eq, so as to obtain the new voltage references Ed* and Eq*.

Thereupon, in the same way as in the first embodiment described above, by PWM control of the converter 3 using the voltage references Vu, Vv and Vw of each phase obtained by 2-phase/3-phase conversion circuit 11 from these new voltage references Ed* and Eq*, damping of the resonance current of AC filter 2 can be achieved in the same way as if a damping resistance were connected.

As described above, with a PWM converter device according to this embodiment, the current flowing between the AC power source 1 and AC filter 2 i.e. the AC input currents iinu and iinw are detected and quantities dependent on the outputs obtained by passing these through bandpass filter 9 that passes the self-resonance frequency band of AC filter 2 are used as voltage reference correction signals to correct the voltage references; converter 3 is arranged to be controlled using these corrected new voltage references, and so resonance due to AC filter 2 for harmonic current suppression, which is connected to converter 3, can be suppressed, without using a damping resistance.

Fifth Embodiment

The construction of the converter device constituting the power conversion device of this embodiment is exactly the same as the construction illustrated in FIG. 7 described above, only the construction of the voltage reference correction circuit 8 being different.

Specifically, as shown in FIG. 6, in this voltage reference correction circuit 8, in the same way as in the fourth embodiment described above, the bandpass filter 9 in FIG. 5 is omitted and a high-pass filter 10 is newly provided instead.

Next, in a converter device according to this embodiment constructed as above, using the high-pass filter 10 that passes frequencies above a specified frequency, new voltage references Ed* and Eq* are obtained by detecting currents Icd and Icq of frequency components exceeding the power source frequency of AC input currents iinu and iinw, and using these as voltage reference correction signals to correct the voltage references Ed and Eq.

Thereupon, in the same way as in the first embodiment, by PWM control of the converter 3 using the voltage references Vu, Vv and Vw of each phase obtained by 2-phase/3-phase conversion circuit 11 from these new voltage references Ed* and Eq*, damping of the resonance current of AC filter 2 can be achieved in the same way as if a damping resistance were connected.

As described above, with a PWM converter device according to this embodiment, the current flowing between AC power source 1 and AC filter 2 i.e. the AC input currents iinu and iinw are detected and quantities dependent on the outputs obtained by passing these through high-pass filter 9 that passes frequencies above a specified frequency are used as voltage reference correction signals to correct the voltage references; converter 3 is arranged to be controlled using these corrected new voltage references, and so resonance due to AC filter 2 for harmonic current suppression, which is connected to converter 3, can be suppressed, without using a damping resistance.

Sixth Embodiment

Figure 8:
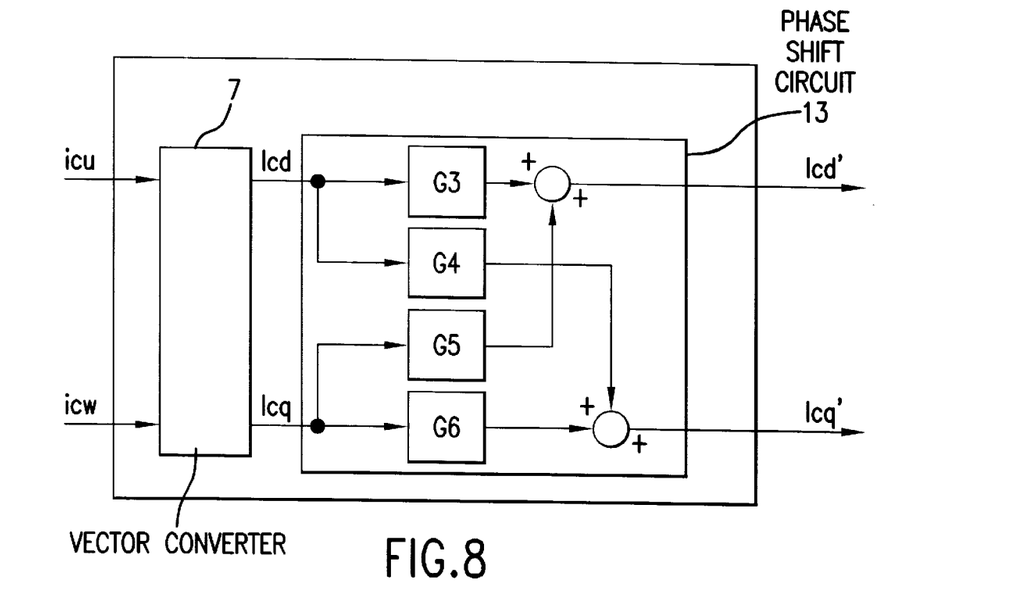
FIG. 8 is a block diagram illustrating an example of the detailed layout of a vector converter in a converter device according to a sixth embodiment of the present invention.

A converter constituting a power conversion device according to this embodiment has a construction wherein, in the first to fifth embodiment described above, the vector converter 7 of FIG. 3, FIG. 5 and FIG. 6 described above is substituted by the circuit illustrated in FIG. 8.

It should be noted that although FIG. 8 illustrates by way of example the case where the vector converter 7 of FIG. 3 is replaced, the identical construction could be applied in the case of FIG. 5 and FIG. 6.

Specifically, as shown in FIG. 8, there is added a phase shift circuit 13 that shifts the phase of the current detected by the current detector (shown by way of example in the Figure as capacitor current detector 4b) by adding the outputs from vector converter 7 multiplied by proportional gains G3, G4, G5 and G6 onto the same axis and the other axis, proportional gains G3, G4, G5 and G6 being adjusted.

Also, although not shown, in the operation of vector converter 7, the phase of the current can be shifted by decomposing this into a current component Iq' parallel with a vector offset in phase by θ from the voltage vector of the AC voltage and a current component Id' that is orthogonal thereto, and employing these instead of Id and Iq in FIG. 3, FIG. 5 and FIG. 6.

Next, in the converter device of this embodiment constructed as above, the phase of the current detected by the current detector is shifted with respect to the phase of the voltage of AC power source 1, and the shifted value of the phase of this current is used as a voltage reference correction signal to correct the voltage references Ed and Eq to obtain new voltage references Ed* and Eq*.

Thereupon, in the same way as in the case of the first to fifth embodiments described above, by performing PWM control of converter 3 using the voltage references Vu, Vv and Vw of each phase obtained by 2-phase/3-phase conversion circuit 11 from these new voltage references Ed* and Eq*, the resonance current of AC filter 2 can be damped in the same way as by connecting a damping resistance.

As described above, with the PWM converter device according to this embodiment, by shifting the phase of the currents detected by the current detector with respect of the phase of the voltage of the AC power source 1, and using these to find voltage reference correction signals whereby the voltage reference is corrected, and controlling converter 3 using these new corrected voltage references, resonance due to AC filter 2 that is connected to converter 3 for harmonic current suppression can be suppressed without employing a damping resistance.

Seventh Embodiment

With the converter device constituting a power conversion device according to this embodiment, in the first to six embodiments described above, voltage reference correction signals icd and icq of FIG. 3, FIG. 5 and FIG. 6 referred to above are further shifted in phase by phase shift circuit 13 to obtain new voltage reference correction signals which are used to correct voltage references Ed and Eq, thereby generating new voltage references Ed* and Eq*.

Figure 9:
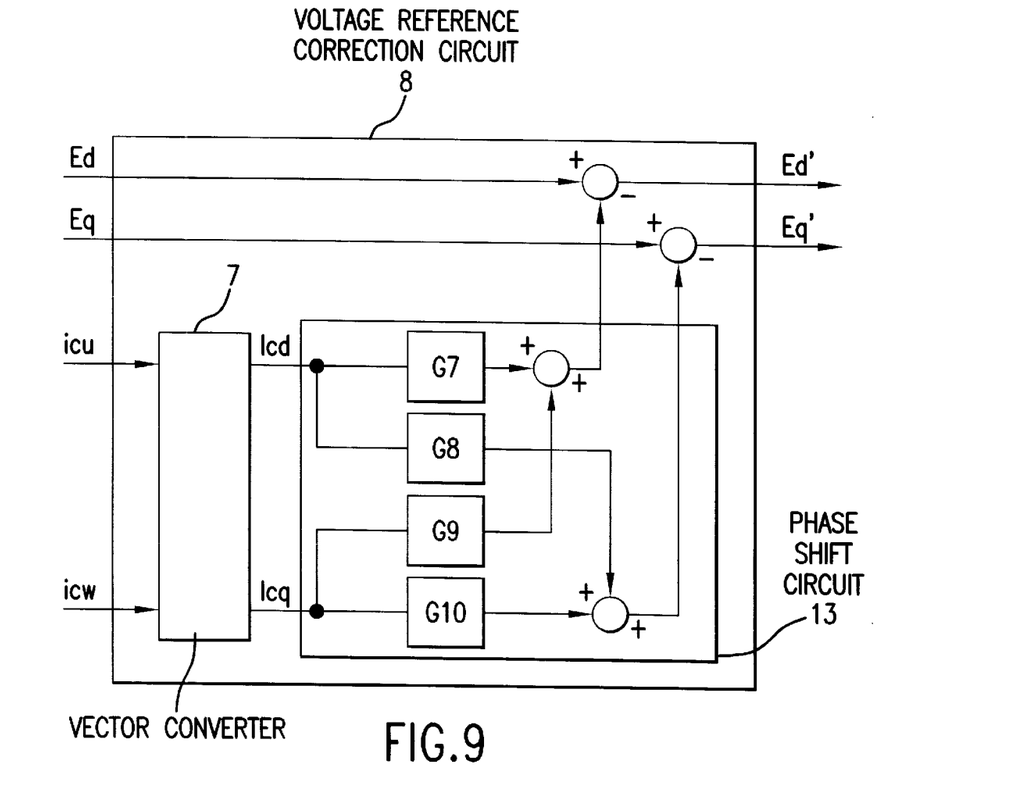
FIG. 9 is a block diagram illustrating an example of the detailed layout of a voltage reference correction circuit in a converter device according to a seventh embodiment of the present invention.

Although in FIG. 9 a case was illustrated by way of example in which phase shift circuit 13 was added to the construction of FIG. 3, voltage reference correction signals icd and icq could be corrected in the same way by adding a phase shift circuit 13 to FIG. 5 or FIG. 6.

Next, in a converter device according to this embodiment constructed as above, by shifting the phase of the voltage reference correction signals icd and icq and using these phase-shifted values of the voltage reference correction signals icd and icq as the new voltage reference correction signals which are employed to correct voltage references Ed and Eq, the new voltage references Ed* and Eq* are obtained.

Thereupon, in the same way as in the first to sixth embodiments, by PWM control of the converter 3 using the voltage references Vu, Vv and Vw of each phase obtained by 2-phase/3-phase conversion circuit 11 from these new voltage references Ed* and Eq*, damping of the resonance current of AC filter 2 can be achieved in the same way as if a damping resistance were connected.

As described above, with a PWM converter device according to this embodiment, by arranging for converter 3 to be controlled using new voltage references obtained by correcting the voltage references with voltage reference correction signals found by shifting the phase of the voltage reference correction signals, resonance due to AC filter 2 for harmonic current suppression connected with converter 3 can be suppressed without using a damping resistance.

Eighth Embodiment

Figure 10:
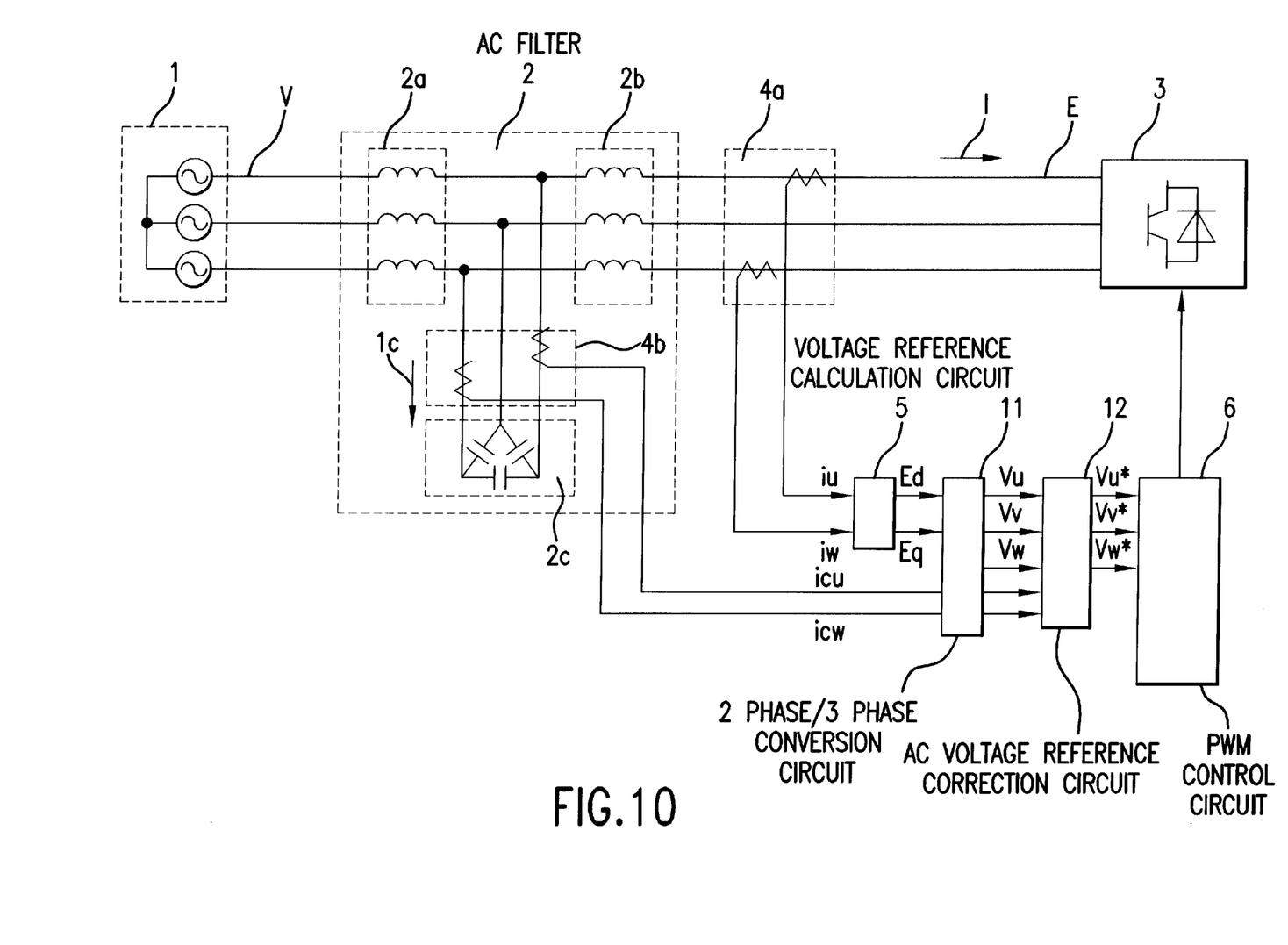
FIG. 10 is a block circuit diagram illustrating an eighth embodiment of a converter device constituting a power conversion device according to the present invention.

FIG. 10 is a block circuit diagram illustrating an example of the construction of a converter device constituting a power conversion device according to this embodiment; parts which are the same as in FIG. 2 are given the same reference symbols and further description thereof is omitted, only the parts which are different being described.

Specifically, as shown in FIG. 10, in the converter device of this embodiment, the voltage reference correction circuit 8 in FIG. 2 is omitted, and instead of this there is provided an AC voltage reference correction circuit 12 downstream of the 2-phase/3-phase conversion circuit 11.

Figure 11:
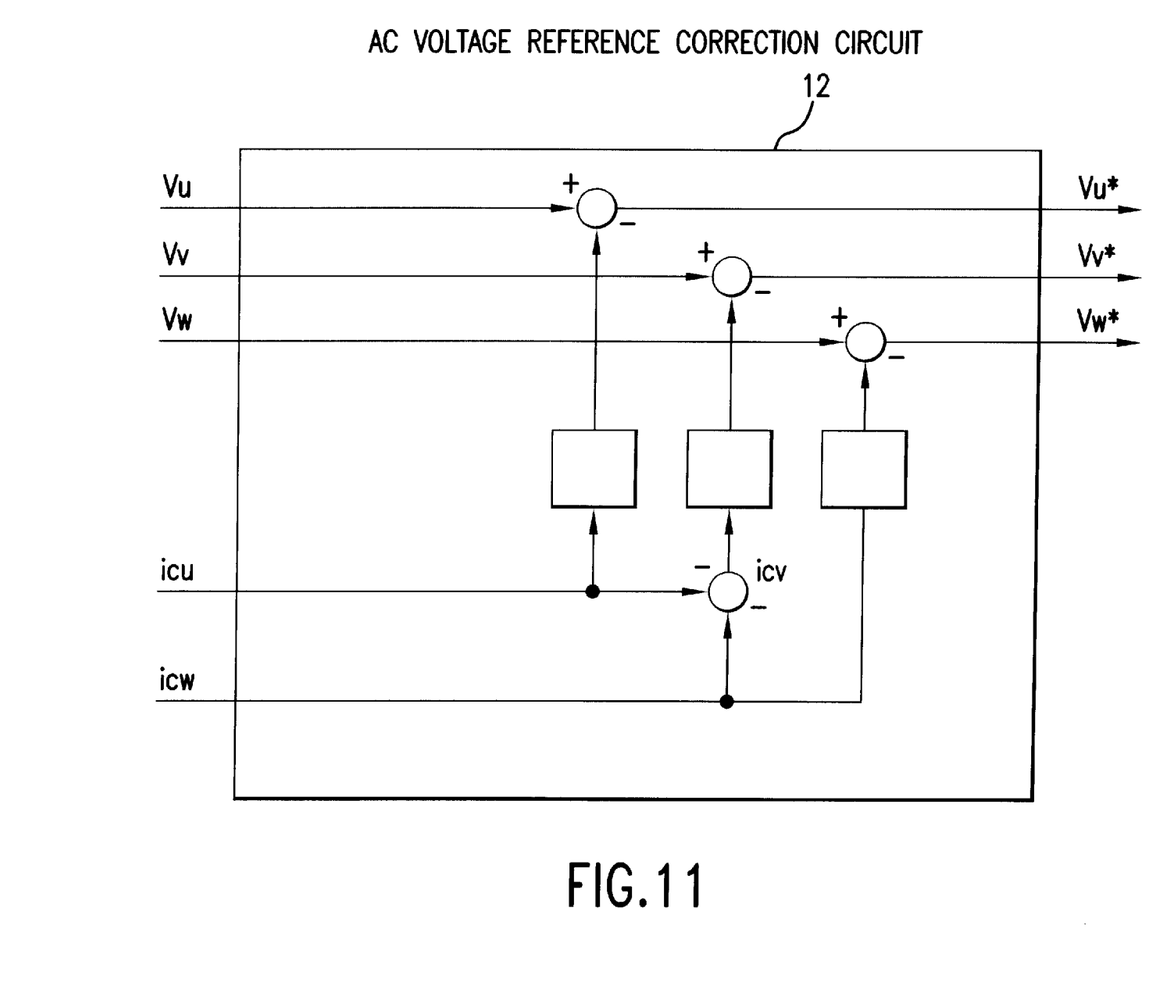
FIG. 11 is a block diagram illustrating an example of the detailed layout of an AC voltage reference correction circuit in a converter device according to the eighth embodiment of the present invention.

FIG. 11 is a block diagram illustrating an example of the detailed construction of AC voltage reference correction circuit 12.

Specifically, as shown in FIG. 11, a construction is adopted wherein the V-phase capacitor current icv is calculated by the principle of three-phase balance from the aforementioned capacitor currents icu and icw, these are multiplied by respective gains and added to the same-phase voltage references Vu, Vv and Vw, to obtain new voltage references Vu*, Vv* and Vw* for each phase, PWM control of converter 3 being performed in accordance therewith.

Next, in a converter device according to this embodiment constructed as above, by exercising control in accordance with expression (2) above in the same way as in the first to the seventh embodiments described above, resonance current of the AC filter 2 can be damped in the same way as if a damping resistance were connected.

As described above, even with a PWM converter device according to this embodiment, resonance due to AC filter 2 for harmonic current suppression that is connected to converter 3 can be suppressed without employing a damping resistance.

Other Embodiments (a) Although, in the first to the eighth embodiments described above, a method was employed wherein the currents of the two phases U and W were detected, and the remaining V phase current was calculated by the principle of three-phase balance, there is no restriction to this, and a method wherein for example the current of the other phase is detected from the currents of any desired two phases, or a method wherein the currents of all three phases are directly detected is included in the essence of the present invention.

(b) The cases where, in the first to the eighth embodiments described above, reactor 2a is a reactor constituent of the AC power source 1 and/or a reactor constituent of the transformer are also included in the essence of the present invention.

(c) Although, in the first to the eighth embodiments described above, Δ-connected capacitors 2c were used for AC filter 1, this does not restrict the construction of AC filter 1 and the cases where these are Y-connected or another inductance component such as a resistance is connected in series or in parallel with reactor 2a, 2b or capacitor 2c of AC filter 1 are also included in the essence of the present invention.

(d) Although, at FIG. 10 in the eighth embodiment, the case was described by way of example where AC voltage reference correction circuit 12 was provided downstream of 2-phase/3-phase conversion circuit 11 instead of the voltage reference correction circuit 8 in FIG. 2, there is no restriction to this and for example in regard to FIG. 4 and FIG. 7 also an AC voltage reference correction circuit 12 could be provided downstream of 2-phase/3-phase conversion circuit 11 in place of voltage reference correction circuit 8 and the same benefits obtained.

As described above, with the present invention, by detecting the current flowing through a prescribed location between the AC power source and the power conversion circuit and using this as a voltage reference correction signal to correct the voltage reference, so that the power conversion circuit is arranged to be controlled using this corrected new voltage reference, a power conversion device can be provided which is of small size and wherein resonance of the AC filter for harmonic current suppression can be suppressed without employing a damping resistance for resonance suppression.

Obviously, numerous additional modifications and variations of the present invention are possible in light of the above teachings. It is therefore to be understood that within the scope of the appended claims, the present invention may be practiced otherwise than as specially described herein.

What is claimed is:

1. A power conversion device having an AC filter for harmonic current suppression comprising a combination of at least some of a reactor, capacitor and resistance and a power conversion circuit that converts AC power into DC power or DC power into AC power and is connected to an AC power source through said AC filter, said power conversion device comprising:

a voltage reference calculation unit configured to calculate and output a voltage reference corresponding to a voltage that is to be output by said power conversion device;

a current detection unit configured to detect and output a resonance current component of said AC filter through a prescribed location between said AC power source and said power conversion circuit; and a voltage reference correction unit configured to use an output from said current detection unit as a voltage reference correction signal to correct a voltage reference that is output from said voltage reference calculation unit.

2. The power conversion device according to claim 1, wherein said current detection unit detects a current flowing through a capacitor of said AC filter; and said voltage reference correction unit uses a quantity responsive to an output from said current detection unit as a voltage reference correction signal, and adds to a voltage reference which is output from said voltage reference calculation unit so as to constitute a new voltage reference.

3. The power conversion device according to claim 1, wherein said current detection unit detects a current flowing between said AC filter and said power conversion circuit; and said voltage reference correction unit uses a quantity responsive to an output from a bandpass filter that passes a self-resonance frequency band of said AC filter and is connected on an output side of said current detection unit as a voltage reference correction signal which is added to a voltage reference constituting an output from said voltage reference calculation unit so as to constitute a new voltage reference.

4. The power conversion device according to claim 1, wherein said current detection unit detects a current flowing between said AC power source and said AC filter; and said voltage reference correction unit uses a quantity responsive to an output from a bandpass filter that passes a self-resonance frequency band of said AC filter and is connected on an output side of said current detection unit as a voltage reference correction signal which is added to a voltage reference constituting an output from said voltage reference calculation unit so as to constitute a new voltage reference.

5. The power conversion device according to claim 1, wherein said current detection unit detects a current flowing between said AC filter and said power conversion circuit; and said voltage reference correction unit uses a quantity responsive to an output from a high-pass filter that passes frequencies above a specified frequency and is connected on an output side of said current detection unit as a voltage reference correction signal which is added to an voltage reference constituting an output from said voltage reference calculation unit so as to constitute a new voltage reference.

6. The power conversion device according to claim 1, wherein said current detection unit detects a current flowing between said AC power source and said AC filter; and said voltage reference correction unit uses a quantity responsive to an output from a high-pass filter that passes frequencies above a specified frequency and is connected to an output of said current detection unit as a voltage reference correction signal which is added to a voltage reference constituting an output from said voltage reference calculation unit so as to constitute a new voltage reference.

7. The power conversion device according to claim 1, wherein said voltage reference correction unit comprises a phase shift unit configured to shift a phase of a current which is output from said current detection unit relative to a phase of a voltage of said AC power source, said voltage reference correction signal being found using an output from said phase shift unit in place of an output from said current detection unit.

8. The power conversion device according to claim 1, wherein a signal obtained by shifting a phase of said voltage reference correction signal is used as a new voltage reference correction signal which is added to a voltage reference that is output from said voltage reference calculation unit to constitute a new voltage reference.

9. The power conversion device according to claim 2, wherein said voltage reference correction unit comprises a phase shift unit configured to shift a phase of a current which is output from said current detection unit relative to a phase of a voltage of said AC power source, said voltage reference correction signal being found using an output from said phase shift unit in place of an output from said current detection unit.

10. The power conversion device according to claim 3, wherein said voltage reference correction unit comprises a phase shift unit configured to shift a phase of a current which is output from said current detection unit relative to a phase of a voltage of said AC power source, said voltage reference correction signal being found using an output from said phase shift unit in place of an output from said current detection unit.

11. The power conversion device according to claim 4, wherein said voltage reference correction unit comprises a phase shift unit configured to shift a phase of a current which is output from said current detection unit relative to a phase of a voltage of said AC power source, said voltage reference correction signal being found using an output from said phase shift unit in place of an output from said current detection unit.

12. The power conversion device according to claim 5, wherein said voltage reference correction unit comprises a phase shift unit configured to shift a phase of a current which is output from said current detection unit relative to a phase of a voltage of said AC power source, said voltage reference correction signal being found using an output from said phase shift unit in place of an output from said current detection unit.

13. The power conversion device according to claim 6, wherein said voltage reference correction unit comprises a phase shift unit configured to shift a phase of a current which is output from said current detection unit relative to a phase of a voltage of said AC power source, said voltage reference correction signal being found using an output from said phase shift unit in place of an output from said current detection unit.

14. The power conversion device according to claim 2, wherein a signal obtained by shifting a phase of said voltage reference correction signal is used as a new voltage reference correction signal which is added to a voltage reference that is output from said voltage reference calculation unit to constitute a new voltage reference.

15. The power conversion device according to claim 3, wherein a signal obtained by shifting a phase of said voltage reference correction signal is used as a new voltage reference correction signal which is added to a voltage reference that is output from said voltage reference calculation unit to constitute a new voltage reference.

16. The power conversion device according to claim 4, wherein a signal obtained by shifting a phase of said voltage reference correction signal is used as a new voltage reference correction signal which is added to a voltage reference that is output from said voltage reference calculation unit to constitute a new voltage reference.

17. The power conversion device according to claim 5, wherein a signal obtained by shifting a phase of said voltage reference correction signal is used as a new voltage reference correction signal which is added to a voltage reference that is output from said voltage reference calculation unit to constitute a new voltage reference.

18. The power conversion device according to claim 6, wherein a signal obtained by shifting a phase of said voltage reference correction signal is used as a new voltage reference correction signal which is added to a voltage reference that is output from said voltage reference calculation unit to constitute a new voltage reference.

19. The power conversion device according to claim 7, wherein a signal obtained by shifting a phase of said voltage reference correction signal is used as a new voltage reference correction signal which is added to a voltage reference that is output from said voltage reference calculation unit to constitute a new voltage reference.

* * * * *